United States Patent [19]

Nishizawa

[11] Patent Number: 5,469,425
[45] Date of Patent: Nov. 21, 1995

[54] METHOD OF MANUFACTURING AN INDEX APPARATUS

[75] Inventor: Hiroshi Nishizawa, Hanamaki, Japan

[73] Assignee: Matsushita Electric Industrial Co., Kadoma, Japan

[21] Appl. No.: 253,222

[22] Filed: Jun. 2, 1994

Related U.S. Application Data

[63] Continuation of Ser. No. 906,463, Jun. 30, 1992, abandoned.

[30] Foreign Application Priority Data

| Jul. 4, 1991 | [JP] | Japan | 3-164277 |
| Jul. 4, 1991 | [JP] | Japan | 3-164285 |

[51] Int. Cl.⁶ .................. G11B 21/08; H02K 29/00
[52] U.S. Cl. ............. 369/189; 369/229; 360/99.08; 310/261; 318/254
[58] Field of Search ............... 360/99.08, 99.11; 310/261, 262, DIG. 3; 369/266, 189, 239, 241; 318/254

[56] References Cited

U.S. PATENT DOCUMENTS

| 4,123,779 | 10/1978 | Goldschmidt | 369/241 X |
| 4,731,680 | 3/1988 | Moriyama et al. | 360/99.08 X |
| 4,803,408 | 2/1989 | Uhde et al. | 318/254 |
| 4,818,922 | 4/1989 | Sears et al. | 318/254 X |
| 4,847,555 | 7/1989 | Stammer et al. | 318/254 X |
| 4,862,045 | 8/1989 | Gleim et al. | 318/254 |
| 4,922,513 | 5/1990 | Joichi | 310/DIG. 3 |
| 5,041,769 | 8/1991 | Iwai | 318/254 |
| 5,090,982 | 2/1992 | Bradshaw et al. | 65/24 |
| 5,213,600 | 5/1993 | Greschner et al. | 65/102 |

FOREIGN PATENT DOCUMENTS

| 0204476 | 9/1987 | Japan | 369/239 |

*Primary Examiner*—Edward K. Look
*Assistant Examiner*—Hoang Nguyen
*Attorney, Agent, or Firm*—Popham, Haik, Schnobrich & Kaufman, Ltd.

[57] ABSTRACT

A method of manufacturing an index apparatus includes thermally transferring a hot stamped section having a low light reflectance onto an outer peripheral surface of a magnet of a frequency generator for speed detection provided on an outer periphery of the motor. The method also includes thermally transferring a hot stamp section having a high light reflectance and a smaller width than the hot stamp section having a low light reflectance onto the hot stamp section having a low light reflectance. A position mark can be provided in the vicinity of the hot stamp section having a high light reflectance. The position mark serves for detecting a position of the hot stamp section having a high light reflectance.

3 Claims, 2 Drawing Sheets

METHOD OF MANUFACTURING AN INDEX APPARATUS

This application is a continuation application of U.S. patent application Ser. No. 07/906,463, filed Jun. 30, 1992, now abandoned.

BACKGROUND OF THE INVENTION

This invention relates to an index apparatus used in a floppy-disk apparatus or the like and, in particular, to an apparatus for detecting and adjusting an index.

A floppy disk has an index which indicates a physical position in the rotating direction of the disk. If the accuracy of this position is deteriorated to a certain extent, reading errors will result.

A conventional index apparatus for detecting such an index utilizes an outer peripheral section of the magnet of a frequency generator (hereinafter abbreviated as "FG") for detecting the speed of the motor. The outer peripheral section of this magnet is coated with a paint or the like that has a low light reflectance. A film or the like (which is, e.g., silver in color) having a high light reflectance is glued to a section of the coated surface. A reflection-type optical sensor is used to generate an index pulse by utilizing a difference in light reflectance due to the above structure.

A problem with the above conventional index apparatus is that the section exhibiting a low light reflectance is realized by painting, resulting in a variation in light reflectance caused by any unevenness in the painting.

Furthermore, since the section exhibiting a high light reflectance is realized by gluing a film to the coated surface, the apparatus is subject to dislocation in the gluing or to separation of the film from the coated surface. Moreover, since this gluing process cannot be automated, considerable man-hours are required for assembly, resulting in high production costs.

A conventional apparatus for index adjustment adjusts an index sensor for generating an index pulse through mechanical positional adjustment in such a way that an index burst signal recorded in media for adjustment (hereinafter referred to as "alignment media") is kept within an adjustment standard.

However, since the above conventional index apparatus is subjected to mechanical adjustment after it has been incorporated in the floppy-disk drive, the adjusting operation is rather complicated. It is thus necessary to provide an index-sensor guide section for adjustment.

Further, when performing fine adjustment for the mechanical adjustment, a correct adjustment cannot be effected because of the fixing screws and the like.

SUMMARY OF THE INVENTION

The present invention has been made with the view to solving the above problems in the prior art. It is accordingly an object of this invention to provide an excellent index apparatus which involves little variation in light reflectance, which allows for automated assembly and which is relatively free from film separation.

Another object of this invention is to provide an excellent index apparatus which not only involves little variation in light reflectance, allows for automated assembly and is relatively free from film separation, but also allows the formation of a hot stamp section having a high light reflectance and a hot stamp section having a low light reflectance in a single process, thereby helping to attain a reduction in production costs.

Still another object of this invention is to provide an excellent index apparatus which helps to solve the above problems in the prior art and which can perform index adjustment correctly and easily by conducting an electrical adjustment.

To achieve the above objects, the present invention provides an index apparatus comprising: a magnet of a frequency generator for speed detection provided on an outer peripheral section of a motor; a hot stamp section having a low light reflectance thermally transferred onto an outer peripheral surface of this magnet; and a hot stamp section having a high light reflectance thermally transferred onto the outer peripheral surface of the magnet.

In another aspect of the present invention, there is provided an index apparatus comprising: a hot stamp section having a high light reflectance and a hot stamp section having a low light reflectance which are formed on a single foil, both said hot stamps being provided on an outer peripheral surface of a magnet of a frequency generator for speed detection provided in an outer peripheral section Of a motor.

Thus, in accordance with the present invention, the light reflectance is determined by the characteristics of the foil on which the hot stamp section having a high light reflectance and the hot stamp section having a low light reflectance are formed consequently, the operational variations can be reduced and the asssembly can be automated, thereby attaining a reduction in production costs and an improvement in product quality.

Further, by forming the hot stamp section having a high light reflectance and the hot stamp section having a low light reflectance on a single foil, not only can operational variations be reduced, the assembly be automated and quality control be improved, but also these hot stamp sections can be realized by a single stamping operation, thereby attaining a further reduction in production costs.

In another aspect: of the present invention, there is provided an index apparatus comprising: a motor having a position mark for index generation and for rotating alignment media; detecting means for detecting the above-mentioned position mark for index generation so as to detect the rotating speed of the motor; delay means for delaying an output of the detecting means; a reading circuit for outputting an index-pulse signal from informations read from the alignment media; and control means for receiving the index-pulse signal and an output of the delay means so as to output an outer index output signal, adjusting a delay time of the delay means by a rotating speed switching signal in such a way that the output of the delay means and the index-pulse signal assume predetermined values, and performing switching control of the rotating speed of the motor.

In accordance with the present invention, the position mark for index generation attached to the motor is detected by the detecting means so as to generate an output corresponding to the rotating speed of the motor, and this is delayed by the delay means and output to the control means and, further, the reading circuit reads informations from the alignment media to output an index burst adjustment signal to the control means, from which an outer index output signal is output.

When a rotating speed switching signal is input to the control means,, the control means performs motor rotating speed switching control and controls the delay means in such a manner that the output of the delay means and the burst signal assume predetermined values.

Thus, in accordance with the present invention, the delay time due to index-burst adjustment is changed in accordance with the rotating speed of the motor, so that an index-burst Value which indicates the positional relationship between the index position and the magnetic head can constantly assume a correct value, thereby eliminating errors attributable to the length of the delay time for adjustment. Further, no reading errors are generated and the switching of the rotating speed of the motor can be realized very easily.

DETAILED DESCRIPTION OF THE PREFERRED EMBODIMENTS

Figure 1:
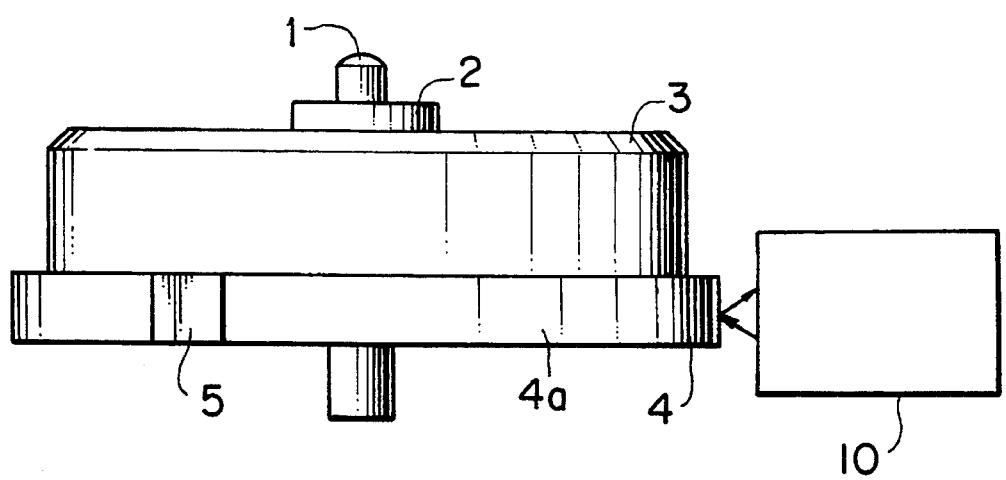
FIG. 1 is a front view of an index apparatus according to a first embodiment of the present invention.

FIG. 1 shows the construction of the first embodiment of the present invention. In the drawing, the reference numeral 1 indicates a shaft of a motor; numeral 2 indicates a boss; and numeral 3 indicates a rotor connected to the shaft 1 through the intermediation of this boss 2.

Further, the reference numeral 4 indicates an FG magnet provided on the outer periphery of the rotor 3; numeral 4a indicates a hot stamp section having a low light reflectance that is thermally transferred onto the outer peripheral surface of the FG magnet 4. The hot stamp section 4a having a low light reflectance is made, for example, of SR86190H manufactured by Kurtz.

The reference numeral 5 indicates a hot stamp section having a high light reflectance that is thermally transferred onto a part of the hot stamp section 4a having a low light reflectlance. The hot stamp section 5 having a high light reflectance is made, for example, of SH Silver manufactured by Kurtz.

The reference numeral 10 indicates a reflection-type sensor which detects a difference in light reflectance between the hot stamp section 4a having a low light reflectance and the hot stamp section 5 having a high light reflectance so as to generate an index pulse.

Next, the operation of the first embodiment, described above, will be explained. In the first embodiment, the thermal transfer of the hot stamp section 4a having a low light reflectance is first performed by means of a roll-transfer-type stamp machine. Then, a stamp machine which determines the width of the hot stamp section 5 having a high light reflectance is used to perform thermal transfer from above and below, thereby completing the stamping.

Silicone rubber is used for the hot stamping rolls and the width stamping, the hardness of the rubber being in the range from 50° to 95° and the surface temperature being in the range from 100° C. to 200° C.

Figure 2:
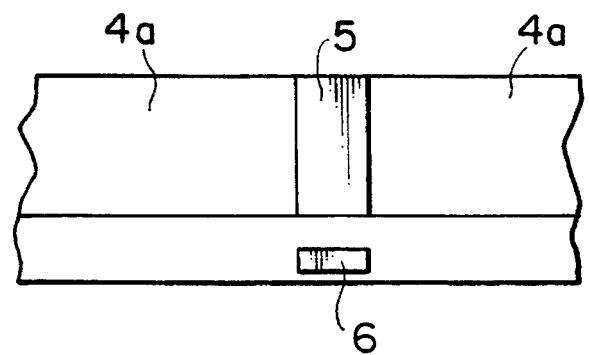
FIG. 2 is a diagram showing the construction of a foil on which a hot stamp section having a high light reflectance and a hot stamp section having a low light reflectance are formed and which is used in an index apparatus according to a second embodiment of the present invention.

FIG. 2 shows the structure of the hot stamp foil in the second embodiment. In the drawing, the reference numeral 4a indicates a hot stamp section having a low light reflectance which corresponds to the section designated by the same numeral in the first embodiment described above; and numeral 5 indicates a hot stamp section having a high light reflectance which likewise corresponds to the section designated by the same numeral in the first embodiment. These hot stamp sections are formed in a single hot stamp foil on the outer peripheral section of an FG magnet.

The reference numeral 6 indicates a positioning mark for detecting the position of the hot stamp section 5 having a high light reflectance. By using this foil, the hot stamp sections can be formed in a single stamping operation.

The second embodiment has an advantage in that it helps to attain a further reduction in costs as compared with the first embodiment.

As is apparent from the above first and second embodiments, in accordance with the present invention, a section having a high light reflectance and a section having a low light reflectance are formed by hot stamping on the outer peripheral surface of an FG magnet provided on the outer periphery of a rotor, so that the light reflectance is determined by the hot stamp foil, whereby the operational variations can be reduced, and dislocations in gluing, separation from the FG magnet, etc. can be avoided.

In addition, the present invention has an advantage in that the operation can be automated.

Further, in accordance with the second embodiment, these operations can be executed at the same time, thereby helping to attain a reduction in production costs.

Figure 3:
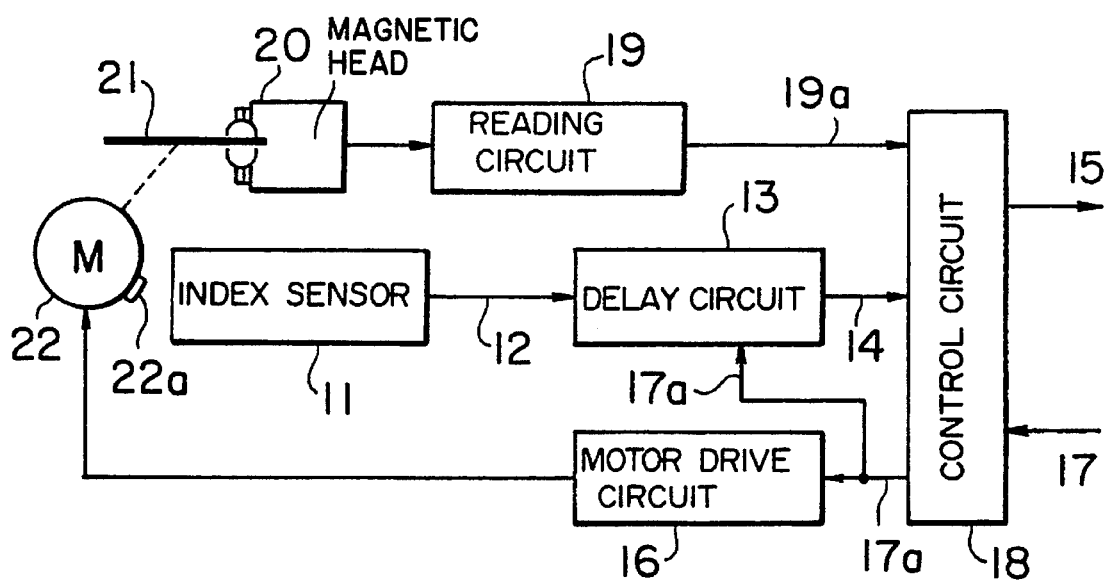
FIG. 3 is a schematic block diagram of an index apparatus according to a third embodiment of the present invention.

FIG. 3 shows a construction of the third embodiment of the present invention. In the drawing, the reference numeral 11 indicates an index sensor serving as a detecting means, which detects an index mark 22a for index generation attached to a motor 22 so as to generate an inner index pulse 12 for each rotation of the motor 22.

The reference numeral 13 indicates an index delay circuit serving as a delay means, which imparts a delay time to the inner index pulse 12 so as to output an index pulse signal 14, which is output to a main body control circuit 18 serving as a control means.

The reference numeral 21 indicates alignment media rotated by the motor 22; and numeral 20 indicates a magnetic head for the recording and reproduction of the alignment media 21.

The reference numeral 19 indicates a reading circuit which receives an index burst adjustment signal read from the magnetic head 20 so as to output it as a burst signal 19a to the main body control circuit 18.

The main body control circuit 18 receives the index pulse signal 14 delayed by the index delay circuit 13 and outputs it as an outer index signal 15, and adjusts the delay time of the delay circuit 13 in such a manner that the delayed index pulse signal 14 and the burst signal 19a assume predetermined values.

The reference numeral 17 indicates a rotating speed switching signal, which is input to the main body control circuit 18. The rotating speed switching signal 17 input to the main body control circuit 18 is divided and used in two ways the signal 17 is output to a motor drive circuit 16 and to the index delay circuit 13 as an inner rotating speed switching signal 17a.

The motor drive circuit 16 receives the inner rotating speed switching signal 17a so as to change the rotating speed of the motor 22, and the index delay circuit 13 receives the inner rotating speed switching signal 17a so as to impart a delay time, which is inversely proportional to the rotating speed of the motor 22, into the inner index signal 12. The inner index signal 12 with the delay time from the inner rotating speed switching signal 17a is outputted as the index pulse signal 14.

Next, the operation of the first embodiment, described above, will be explained. The motor 22 is rotated by the motor drive circuit 16. This causes the point mark 22a for index generation attached to the motor 22 to be detected by the index sensor 11 each time the motor 22 makes one rotation, thereby causing the inner index pulse 12 to be output from the index sensor 11. The inner index pulse 12 is input to the index delay circuit 13, where it is furnished with a predetermined delay time and transmitted to the main body control circuit 18 as the index pulse signal 14.

The alignment media 21, on the other hand, are rotated by the motor 22. The information in the alignment media 21 are read by the magnetic head 20 serving as the recording/reproducing head, and the index burst adjustment signal 19a is transmitted to the reading circuit 19. The reading circuit 19 receives this index burst adjustment signal and outputs the same to the main body control circuit 18 as the burst signal 19a.

The main body control circuit 18 receives the index pulse signal delayed by the index delay circuit 13 and outputs the outer index output signal 15 and, at the same time, adjusts the delay time of the index delay circuit 13 in such a way that the index pulse signal 14 and the burst signal 19a assume predetermined values.

Further, when the rotating speed switching signal 17 is input to the main body control circuit 18, the rotating speed switching signal 17 is divided and used two ways the signal 17 is output to the index delay circuit 13 and the motor drive circuit 16 as the inner rotating speed switching signal 17a.

Through these processes, the motor drive circuit 16 changes the rotating speed of the motor 22 and, at the same time, the index delay circuit 13 imparts a delay time, which is inversely proportional to the rotating speed of the motor, to the inner index signal 12 so as to output the index pulse signal 14 to the main body control circuit 18.

An index burst value indicates a relative rotation-angle positional relationship between the index position and the magnetic head 20. In mechanical adjustment, the delay time is changed in accordance with the rotating speed of the motor. In electrical adjustment, however, there is generated an error that the delay time does not change in accordance with the rotating speed. If this error (which is in proportion to the delay time) grows to a certain extent it constitutes a reading error. In this embodiment, however, a delay time is imparted to the inner index pulse 12 inside the index delay circuit 13 by the inner rotating speed switching signal 17a, so that such an error can be eliminated.

In this way, the index pulse signal 14 is output from the index delay circuit 13. Assuming, for example, that the rotating speed of the motor 22 is to be switched from 300 rpm to 360 rpm and a delay time of 6 ms is given when the rotating speed is 300 rpm, a change to the rotating speed of 360 rpm causes the delay time to be changed to 6 ms×(300/360)=5 ms, thus making it possible to obtain a correct delay time which is inversely proportional to the rotating speed.

Figure 4:
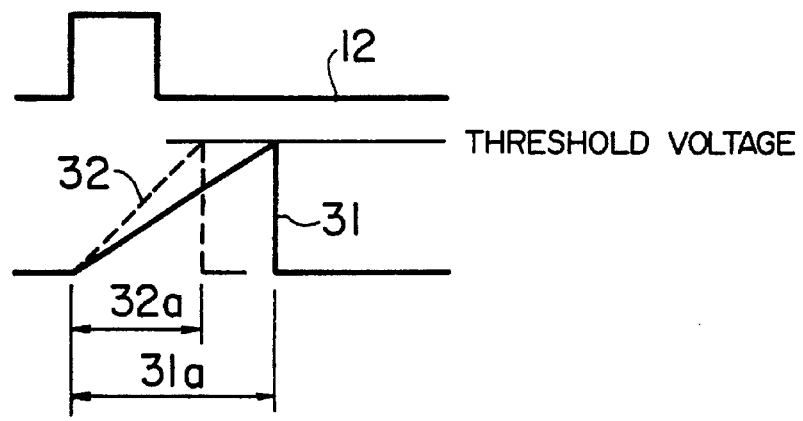
FIG. 4 is a signal waveform diagram of an index apparatus according to a fourth embodiment of the present invention.

FIG. 4 is a signal waveform diagram for illustrating the operation of the delay means of the fourth embodiment of the present invention. The drawing shows a case where the inner index pulse 12 is changed in correspondence with a switching between 300 rpm and 360 rpm as in the third embodiment described above.

The reference numeral 31 indicates an inner index pulse which gives the delay time 31a it takes for a threshold to be reached when a one-shot multivibrator (not shown) is charged with a constant current when the rotating speed is 300 rpm. Likewise, for the rotating speed of 360 rpm, an inner index pulse 32 corresponds to a delay time 32a. The constant current values are also in the proportion of 300:360 and switched correctly in accordance with the rotating speed.

The fifth embodiment of the present invention can be realized by providing a comparison voltage (threshold voltage) for a comparator in inverse proportion to the rotating speed.

Figure 5:
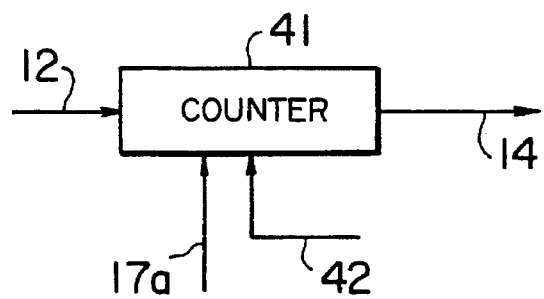
FIG. 5 is a block diagram of a delay circuit in an index apparatus according to a fifth embodiment of the present invention.

FIG. 5 is a block diagram of a delay circuit constituting the delay means of the sixth embodiment. A counter 41 is reset by the inner index pulse 12. The delayed index pulse signal 14 is output after N clock pulses 42 have been counted when the rotating speed is 300 rpm, as in the third embodiment.

The count number N of the counter 41 is changed by the inner rotating speed switching signal 17a in correspondence with the switching of the rotating speed from 300 rpm to 360 rpm as N×300/360, thereby changing the delay time in inverse proportion to the rotating speed.

As is apparent from the sixth embodiment, the seventh embodiment of the present invention can be realized by providing a clock frequency which is inversely proportional to the rotating speed.

Further, the eighth embodiment of the present invention can be realized by changing the time constant of the one-shot multivibrator. In this case, the operation is obviously the same as in the switching of the constant current shown in FIG. 4.

As is apparent from the third to the eighth embodiments described above, it is possible, in accordance with the present invention, to keep the index burst position always at the correct position by changing the delay time in accordance with the rotating speed, so that the correct index burst value can be ensured even in the case of an adjustment involving a relatively long delay time, thereby preventing the generation of reading errors.

Further, in accordance with the present invention, electrical adjustment is adopted, so that the operation can be conducted easily, and fine adjustment can also be performed, making it possible to easily realize operational automatization. Further, since it can be incorporated into the control IC of the delay circuit main body or the motor drive IC, an improvement can be attained in terms of production costs and reliability.

What is claimed is:

1. A method of manufacturing an index apparatus electrically connected with a magnetic head for reading alignment media, said method comprising the steps of:

providing said magnetic head for reading alignment media relative to a motor for rotating said alignment media, said motor having a rotor with a magnet;

providing a position mark on said rotor;

providing an index sensor for detecting said position mark, said index sensor being positioned at a fixed position relative to said magnetic head, whereby during operation of said motor, index burst signals are generated by said magnetic head reading said alignment media, said position mark rotating on said rotor is detected by said index sensor, index pulse signals are generated by said detection of said position mark, a time difference in occurrence between said index pulse signals and said index burst signals is determined for a given speed of said motor, and at least one of said motor speed and said index pulse signals is adjusted to maintain said determined time difference;

thermally transferring a first hot stamp section having a low light reflectance onto an outer periphery of said rotor; and thermally transferring a second hot stamp section having a high light reflectance onto said first hot stamp section at said position mark to be detected by said index sensor, wherein said second hot stamp section has a smaller width than said first hot stamp section, and placement of said hot stamp sections is independent of poles of said magnet in said rotor.

2. A method of manufacturing an index apparatus electrically connected with a magnetic head for reading alignment media, said index apparatus including a motor for rotating said alignment media in order to be read by said magnetic head, said method comprising the steps of:

providing a position mark on an outer periphery of a rotor in said motor;

thermally transferring a first hot stamp section having a low light reflectance onto said outer periphery of said rotor;

thermally transferring a second hot stamp section having a high light reflectance onto said first hot stamp section at said position mark, said second hot stamp section having a smaller width than said first hot stamp section; and providing an index sensor for detecting said second hot stamp section during operation of said motor, said rotor with said second hot stamp section and said index sensor forming a frequency generator for said index apparatus, wherein said second hot stamp section and said position mark are located relative to said alignment media being read by said magnetic head during said operation of said motor, so that rotation of said second hot stamp section on said rotor during operation of said motor is detected by said index sensor, index pulse signals from detecting said rotation of said second hot stamp section are generated, index burst signals generated from said magnetic head reading said alignment media are detected, a time difference in occurrence between said index pulse signals and said index burst signals is determined for a given speed of said motor, and at least one of said motor speed and said index pulse signals is adjusted to maintain said determined time difference.

3. A method of manufacturing an index apparatus, said method comprising the steps of:

providing a magnetic head for reading alignment media relative to a motor for rotating said alignment media, said motor having a rotor;

providing a position mark on an outer peripheral surface of said rotor, wherein the mark is defined at a position for a first hot stamp section to be detected by an index sensor, so that index burst signals are generated by said magnetic head reading said alignment media, said first hot stamp section rotating on said rotor is detected by said index sensor, index pulse signals are generated by said detection of said first hot stamp section, a time difference in occurrence between said index pulse signals and said index burst signals is determined for a given speed of said motor, and at least one of said motor speed and said index pulse signals is adjusted to maintain said determined time difference;

thermally transferring a second hot stamp section having a low light reflectance onto said outer peripheral surface of said rotor; and thermally transferring said first hot stamp section onto said second hot stamp section at said position mark, said first hot stamp section having a high light reflectance and a smaller width than said second hot stamp section.

* * * * *